(12) United States Patent
Takaiwa (10) Patent No.: US 8,238,120 B2
(45) Date of Patent: Aug. 7, 2012

(54) ELECTRONIC DEVICE WITH A MOBILE SWITCH

(75) Inventor: Yuji Takaiwa, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 12/848,771

(22) Filed: Aug. 2, 2010

(65) Prior Publication Data

US 2011/0157861 A1    Jun. 30, 2011

(30) Foreign Application Priority Data

Dec. 28, 2009    (JP) ................. 2009-298438

(51) Int. Cl.
*H05K 7/00*    (2006.01)
(52) U.S. Cl. ......... 361/837; 174/260; 439/500; 439/677
(58) Field of Classification Search .................. 361/837; 439/500, 677; 174/260
See application file for complete search history.

(56) References Cited

U.S. PATENT DOCUMENTS

| 2006/0178040 | A1* | 8/2006 | Kurosawa | 439/500 |
| 2007/0164703 | A1* | 7/2007 | Noguchi et al. | 320/107 |

FOREIGN PATENT DOCUMENTS

| JP | 62-106467 | 7/1987 |
| JP | 1-113438 | 7/1989 |
| JP | 06-236225 | 8/1994 |
| JP | 06-289975 | 10/1994 |
| JP | 6-88048 | 12/1994 |
| JP | 0688048MT | * 12/1994 |
| JP | 7-13031 | 3/1995 |
| JP | 7-168648 | 7/1995 |
| JP | 8-185843 | 7/1996 |
| JP | 63-35239 | 9/1998 |

OTHER PUBLICATIONS

Japanese Patent Application No. 2009-298438; Notice of Rejection; Mailed Nov. 9, 2010 (English translation).

* cited by examiner

*Primary Examiner* — Yuriy Semenenko
*Assistant Examiner* — Andargie M Aychillhum
(74) *Attorney, Agent, or Firm* — Blakely, Sokoloff, Taylor & Zafman LLP (57) ABSTRACT

According to one embodiment, an electronic device includes: a main body; a switch; and a movement support portion. A component is detachably installed in a component installation portion of the main body. The switch includes a base and a movable portion. The switch becomes an ON state when the movable portion is moved relatively closer to the base. The movement support portion supports the switch so as to permit reciprocal movement of the switch along a direction in which the movable portion is moved closer to the base, and is moved to one of directions of the reciprocal movement by a predetermined ON operation. While the component is installed in the component installation portion, the switch becomes the ON state when the switch is sandwiched between the component and the movement support portion, and when the movable portion is moved relatively closer to the base.

7 Claims, 5 Drawing Sheets

(12) United States Patent

US 8,238,120 B2

ELECTRONIC DEVICE WITH A MOBILE SWITCH

CROSS-REFERENCE TO RELATED APPLICATIONS

This application is based upon and claims the benefit of priority from Japanese Patent Application No. 2009-298438, filed Dec. 28, 2009, the entire contents of which are incorporated herein by reference.

FIELD

An embodiment described herein relates generally to an electronic device.

BACKGROUND

Conventionally, there has been known an information processing device comprising a housing having a container for detachably accommodating therein a pen as a component. The information processing device starts supplying power upon detection that the pen is taken out of the holder (for example, see Japanese Patent Application Publication (KOKAI) No. H6-289975).

However, the structure disclosed in Japanese Patent Application Publication (KOKAI) No. H6-289975 requires a sensor to detect that the pen has been taken out. Accordingly, for example, the number of components is increased, the device structure is made complex, and the production cost is increased.

BRIEF DESCRIPTION OF THE SEVERAL VIEWS OF THE DRAWINGS

A general architecture that implements the various features of the invention will now be described with reference to the drawings. The drawings and the associated descriptions are provided to illustrate embodiments of the invention and not to limit the scope of the invention.

DETAILED DESCRIPTION

In general, according to one embodiment, an electronic device comprises: a main body; a switch; and a movement support portion. A component installation portion is formed to the main body, and a component is detachably installed in the component installation portion. The switch comprises a base and a movable portion. The switch becomes an ON state when the movable portion is moved relatively closer to the base. The movement support portion is provided to the main body. The movement support portion supports the switch so as to permit reciprocal movement of the switch along a direction in which the movable portion is moved closer to the base, and is moved to one of directions of the reciprocal movement by a predetermined ON operation. While the component is installed in the component installation portion, the switch becomes the ON state when the switch is sandwiched between the component and the movement support portion moved to the one of the directions of the reciprocal movement by the ON operation, and when the movable portion is moved relatively closer to the base.

According to another embodiment, an electronic device comprises: a main body; a switch; a movement support portion, and an opposing member. A component installation portion is formed to the main body, and a component is detachably installed in the component installation portion. The switch comprises abase and a movable portion. The switch becomes an ON state when the movable portion is moved relatively closer to the base. The movement support portion is provided to the main body. The movement support portion supports the switch so as to permit reciprocal movement of the switch along a direction in which the movable portion is moved closer to the base, and is moved to one of directions of the reciprocal movement by a predetermined ON operation. The opposing member is arranged in a track of the movement support portion toward the one of the directions of the reciprocal movement when the component is installed in the component installation portion, and is moved away from the track when the component is removed from the component installation portion. While the component is installed in the component installation portion, the switch becomes the ON state when the switch is sandwiched between the opposing member and the movement support portion moved to the one of the directions of the reciprocal movement by the ON operation, and when the movable portion is moved relatively closer to the base so that the switch becomes the ON state.

Embodiments are described below in greater detail with reference to the drawings.

An electronic device 1 according an embodiment is described as a personal computer, as an example. Various components E, such as a board with a central processing unit (CPU), a memory, and other electronic components installed thereon, a hard disk drive (HDD), an optical disk drive (ODD), and a speaker, are housed in a housing 2a in a main body 2 of the electronic device 1.

Figure 1:
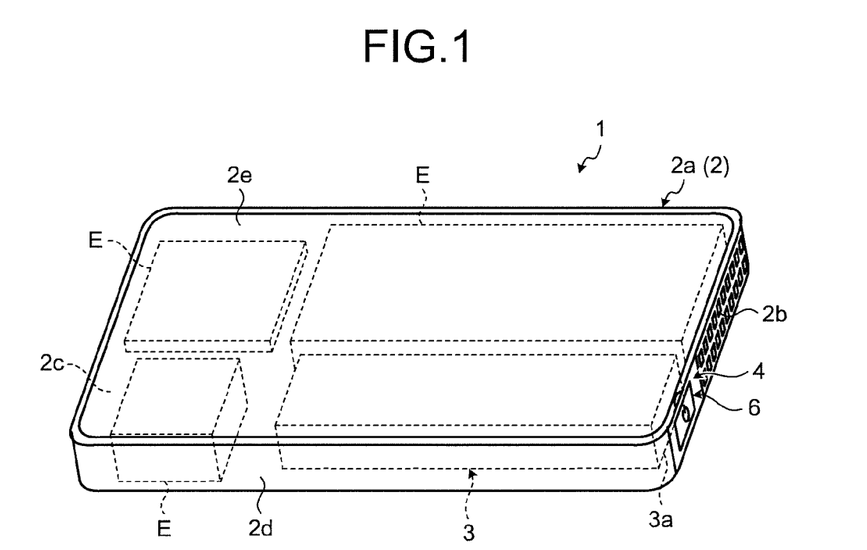
FIG. 1 is an exemplary perspective view of an electronic device according to an embodiment.
Figure 3:
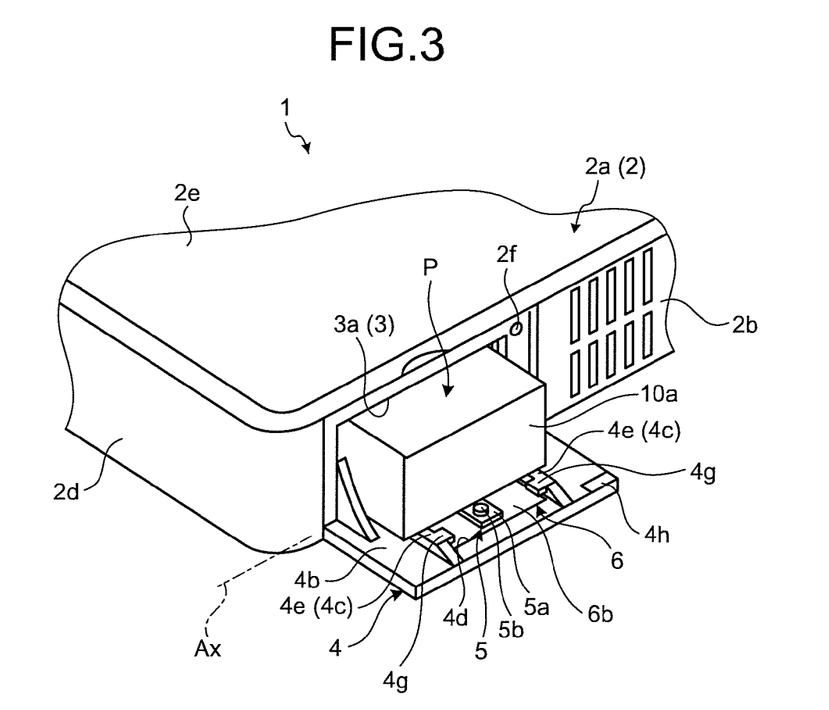
FIG. 3 is an exemplary perspective view of the part of the electronic device with a cover of a component installation portion being opened and a part of a component exposed from the component installation portion in the embodiment.
Figure 4:
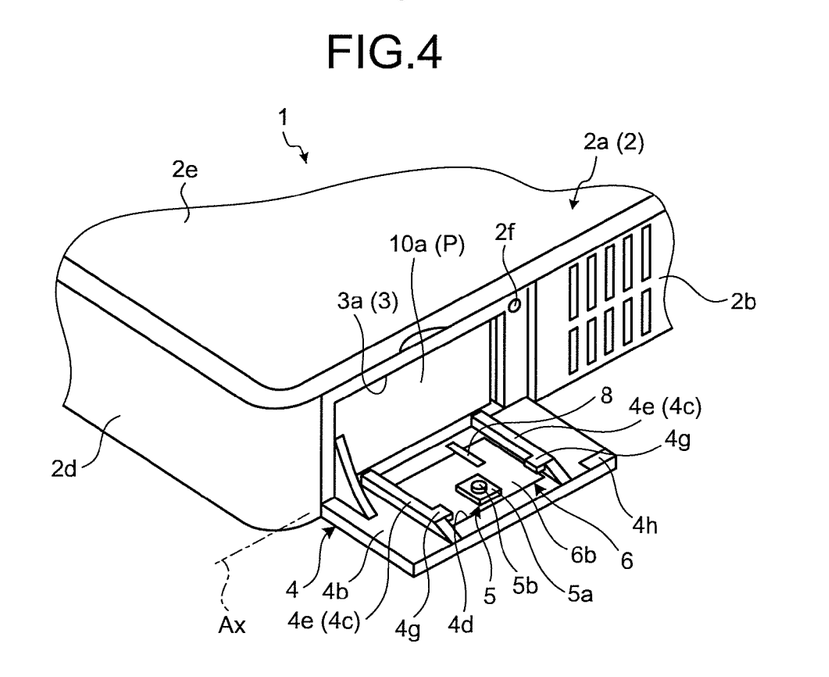
FIG. 4 is an exemplary perspective view of the part of the electronic device with the cover of the component installation portion being opened and the component being mounted in the component installation portion in the embodiment.

As illustrated in FIG. 1, the main body 2 comprises the housing 2a having a flat rectangular parallelepiped shape. As illustrated in FIGS. 3 and 4, a recess 3 opening at a front face 2b and recessed toward a back face 2c of the housing 2a is formed in the main body 2. A component P (for example, a battery) is detachably mounted in the recess 3. In other words, in this embodiment, the recess 3 corresponds to a component installation portion.

Figure 2:
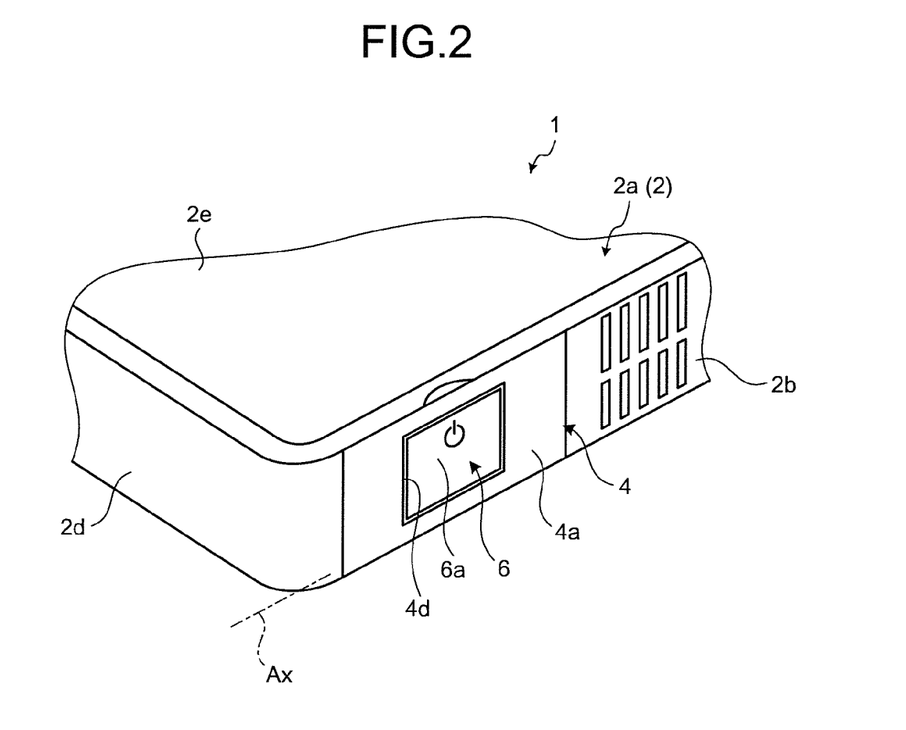
FIG. 2 is an exemplary perspective view of a part of the electronic device in the embodiment.

As illustrated in FIG. 2, an opening 3a of the recess 3 is openably covered by a cover 4 attached to the main body 2 (the housing 2a, for example). In this embodiment, the cover 4 is rotatably supported on the main body 2 about a rotation axis Ax laid along a bottom edge of the opening 3a by a hinge mechanism not illustrated. In other words, as illustrated in FIGS. 3 and 4, when the cover 4 is tilted down forward, the recess 3 opens to the front.

In this position, a back face 4b of the cover 4 is exposed upward. On the back face 4b, ribs 4c and 4c having a fixed height are laid in parallel to each other, along a direction from a base end of the cover 4 to a tip end of the cover 4. As illustrated in FIG. 3, the component P to be installed in or removed from the recess 3 is placed on the ribs 4c and 4c. A top face 4e of the rib 4c is almost at the same height as the bottom of the recess 3 when the cover 4 is opened. In this manner, the rib 4c functions as a member for reinforcing the cover 4, as well as a guide for installation and removal of the component P in and from the recess 3.

As illustrated in FIG. 2, an operation portion 6 is provided at a front face 4a of the cover 4. The operation portion 6 at least performs an ON operation of a press switch 5 (see FIGS. 4 and 5, for example) which is for example configured as a power switch. The operation portion 6 is received by a rectangular penetrating hole 4d formed at a center of the cover 4 with a predetermined clearance. The front face 4a of the cover 4 and a front face 6a of the operation portion 6 form a continuous plane. The front face 6a is an area to be pressed.

Figure 5:
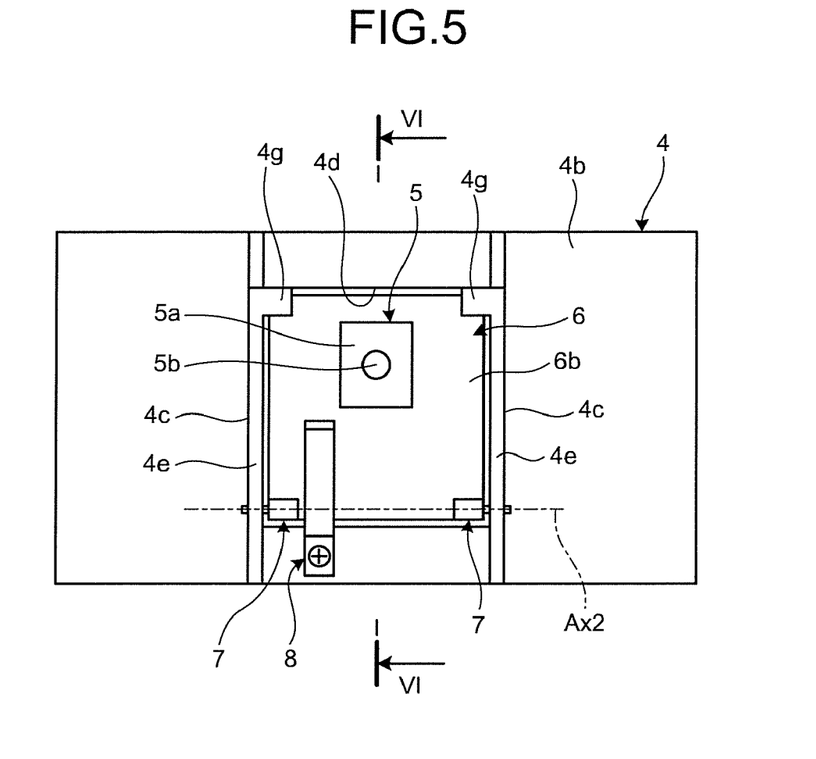
FIG. 5 is an exemplary rear view of the cover seen from a rear side of the cover in the embodiment.
Figure 6:
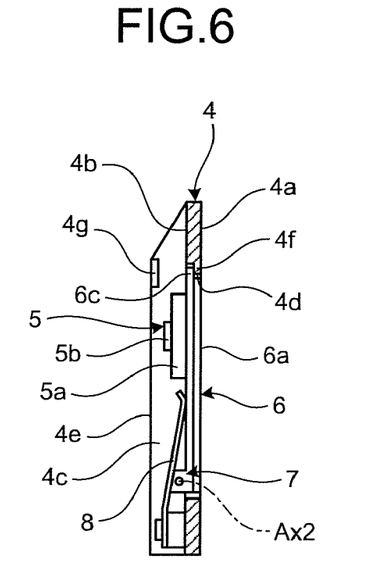
FIG. 6 is an exemplary vertical cross sectional view of the cover taken along the line VI-VI in FIG. 5 in the embodiment.

As also illustrated in FIGS. 5 and 6, the operation portion 6 is formed as a rectangular plate. The operation portion 6 is rotatably supported on the cover 4 around a rotation axis Ax2 laid along a bottom edge of the penetrating hole 4d by a hinge mechanism 7.

Figure 7:
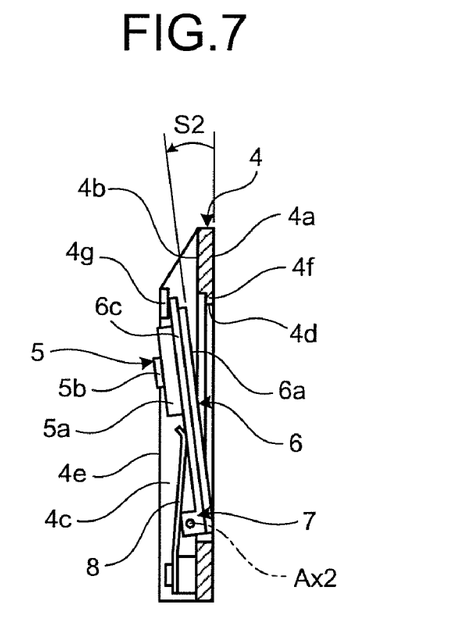
FIG. 7 is an exemplary vertical sectional view of the cover when a movement support portion arranged on the cover is pressed while the component not being mounted in the component installation portion in the embodiment.

As illustrated in FIGS. 6 and 7, when the operation portion 6 is pressed from the front face 6a, the operation portion 6 tilts down toward a far side (rearward, leftward in FIGS. 6 and 7). Here, the operation portion 6 is further biased in a direction from a back face 6b to the front face 6a by a plate spring 8 that is a biasing mechanism provided on the cover 4. A flange 6c facing outward is arranged at a periphery portion of the operation portion 6. Correspondingly, a flange 4f facing inward is provided at a periphery portion of the penetrating hole 4d on the cover 4. When the flange 4f and the flange 6c are engaged with each other, the operation portion 6 is prevented from moving further ahead from the cover 4. Therefore, the operation portion 6 biased by the plate spring 8 remains at the initial position illustrated in FIG. 6 when no pressing operation is applied thereto. The cover 4 is kept closed by a magnet attractor 2f and a magnet attractor target 4h. The magnet attractor 2f is provided on the front face 2b of the housing 2a. The magnet attractor target 4h is made of a magnetic material provided on the cover 4.

As illustrated in FIGS. 6 and 7, the cover 4 is provided with a stopper 4g that stops the operation portion 6 at a position spaced apart rearward of the operation portion 6 from the cover 4. As illustrated in FIG. 7, the stopper 4g regulates the rearward movement of the operation portion 6. Therefore, the operation portion 6 does not move further backward from the position where the operation portion 6 is stopped by the stopper 4g, as illustrated in FIG. 7. In other words, the operation portion 6 can reciprocally move between the initial position illustrated in FIG. 6 and a position at which the operation portion 6 is pressed at most.

According to this embodiment, the stopper 4g is arranged on the rib 4c. Therefore, a stopper can be formed relatively easily in the structure having the ribs 4c. Furthermore, a more rigid stopper can be provided than a structure in which a protrusion or the like is arranged separately.

In this embodiment, as illustrated in FIGS. 4 to 6, for example, the press switch 5 is arranged at a tip end of the back face 6b of operation portion 6. The press switch 5 comprises a base 5a and a movable portion 5b that is movably supported by the base 5a. In the press switch 5, the movable portion 5b is mounted on the back face 6b so as to protrude in a direction normal to the back face 6b. Thus, when the movable portion 5b is pressed frontward into the base 5a in a direction perpendicular to the back face 6b and moved closer to the base 5a, internal contact points (e.g., a fixed contact point and a moving contact point not illustrated) are electrically connected with each other to turn on the press switch 5.

The movable portion 5b is moved rightward in FIGS. 6 and 7 to be closer to the base 5a. The operation portion 6 is moved toward left in FIGS. 6 and 7 by the ON operation (a pressing operation), and toward right in FIGS. 6 and 7 by biasing force applied by the plate spring 8. The operation portion 6 is supported on the cover 4 so that the operation portion 6 is reciprocally movable leftward and rightward in FIGS. 6 and 7. Therefore, in this embodiment, the operation portion 6 corresponds to a movement support portion. The movement support portion supports the press switch 5 on the main body 2 so as to permit a reciprocally movement of the press switch 5 along a direction in which the movable portion 5b is moved closer to the base 5a. The movement support portion is moved to one of directions of the reciprocal movement (leftward in FIGS. 6 and 7) by the ON operation. The front side 6a is a press portion to be pressed by a finger of a user. The front face 6a is arranged on one of two sides of the operation portion 6. With respect to the operation portion 6, the one of the two sides of the operation portion 6 is in other one of the directions of the reciprocal movement (rightward in FIGS. 6 and 7).

Figure 8:
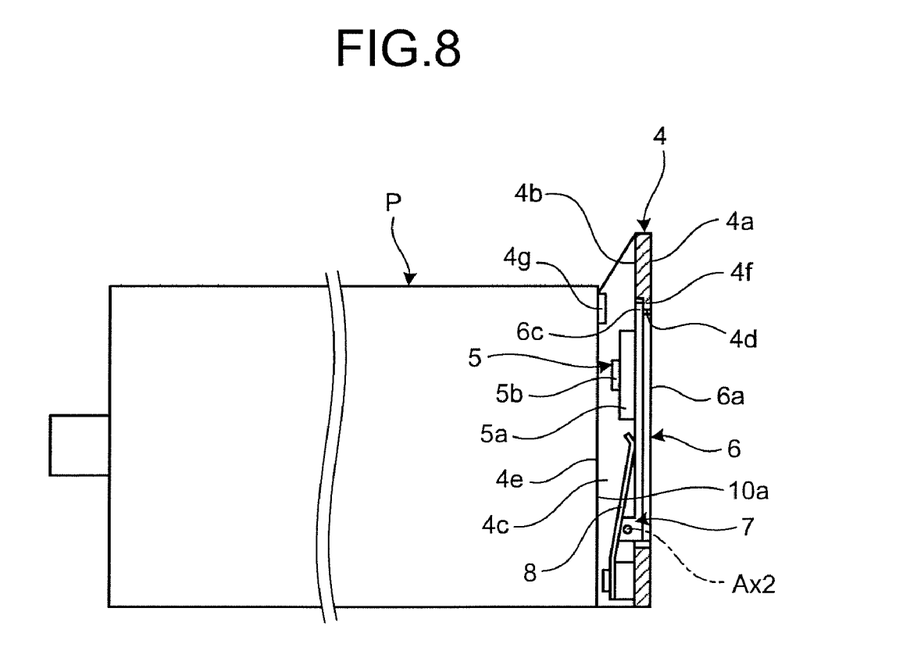
FIG. 8 is an exemplary vertical sectional view of the cover with the component being mounted in the component housing portion and the movement support portion being at its initial position in the embodiment.
Figure 9:
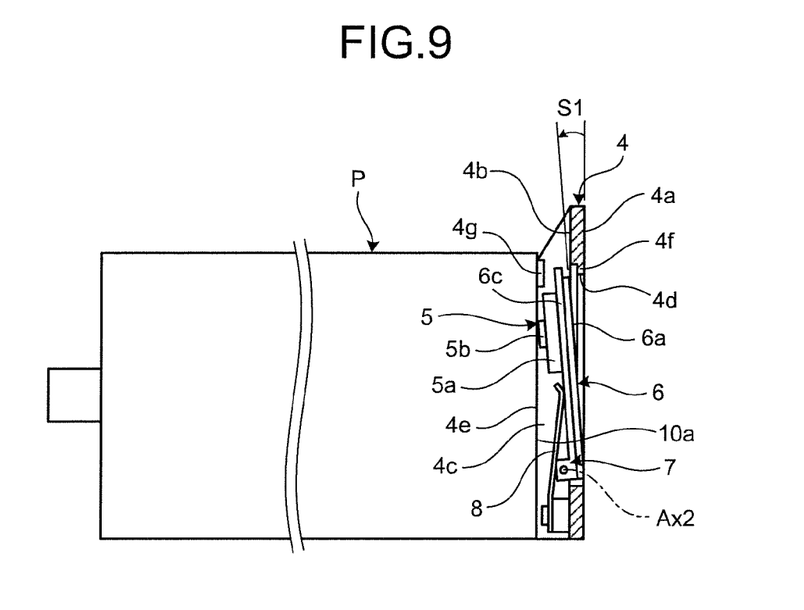
FIG. 9 is an exemplary vertical sectional view of the cover with the component being mounted in the component housing portion and the movement support portion being pressed inward in the embodiment.

In this embodiment, as illustrated in FIG. 8, when the component P is installed in the recess 3, the component P is positioned behind the operation portion 6. As illustrated in FIG. 9, if the operation portion 6 is tilted toward the far side by the pressing operation performed by a user with a finger, the movable portion 5b is brought into contact with an end 10a of the component P, and the movable portion 5b is pressed by the end 10a into the base 5a. In other words, in this embodiment, when the operation portion 6 is pressed backward while the component P is installed in the recess 3, the press switch 5 is sandwiched between the operation portion 6 and the component P, and the movable portion 5b is moved relatively closer to the base 5a so that the press switch 5 becomes an ON state.

When the component P is not installed in the recess 3, the operation portion 6 is moved to a position at which the operation portion 6 is pressed at the most, as explained earlier with reference to FIG. 7, without being brought into contact with the component P. In this case, the movable portion 5b is not brought closer to the base 5a. Therefore, the internal contact points in the press switch 5 are kept isolated, and the press switch 5 is kept in the OFF state.

In other words, in this embodiment, while the component P is installed in the recess 3, the press switch 5 becomes the ON state when the operation portion 6 is pressed. While the component P is not installed in the recess 3, the press switch 5 is kept in the OFF state even when the operation portion 6 is pressed.

Therefore, a user can recognize whether the component P is installed depending on whether a system corresponding to the press switch 5 (for example, the entire system of the electronic device 1 if the press switch 5 is a power switch) is started by the press switch 5. In other words, it is possible to provide a system for determining whether the component P is installed with a relatively simple structure by using an existing switch, without separately providing a sensor or the like.

By comparing FIGS. 7 and 9, it can be understood that a stroke S2 of the operation portion from its initial position at which the press switch 5 is in the OFF state (FIG. 8) to a position at which the operation portion 6 is regulated by the stopper 4g is longer than a stroke S1 of the operation portion 6 from the initial position to a position at which the press switch 5 is in the ON state (S2>S1). Because these strokes of the operation portion 6 are different, a user can recognize whether the component P is installed in the recess 3.

As described above, in this embodiment, when the component P is installed in the recess 3, the press switch 5 is sandwiched between the component P and the operation portion 6 moved toward the one of the directions of the reciprocal movement by the ON operation. In this manner, the movable portion 5b of the press switch 5 is moved relatively closer to the base 5a, and the press switch 5 becomes the ON state. Thus, a user can recognize whether the component P is installed in the recess 3 depending on whether a system corresponding to the press switch 5 (for example, the entire system of the electronic device 1 if the press switch 5 is a switch) is started by the press switch 5. In other words, it is possible to provide a mechanism capable of determining whether the component P is installed with a relatively simple structure by using switches (start switch) on other devices, without separately providing a sensor or the like. In this embodiment, as long as the component P is not installed in the recess 3, the system corresponding to the press switch 5 cannot be started. Therefore, for the component P, it is preferable to use an element essential for the operation of the system. In the structure according to this embodiment, starting and stopping of a system are not directly affected by installation of the component P, unlike the technology disclosed in Japanese Patent Application Publication (KOKAI) No. H6-289975.

Furthermore, in this embodiment, the front face 6a that receives the pressing operation as the ON operation, is formed on the front face of the operation portion 6 movably supporting the press switch 5. Therefore, the movement support portion and the press portion can be provided in a simpler structure than a structure in which the press portion is not arranged on the front side of the movement support portion with respect to the pressing direction. Especially in this embodiment, because the movement support portion movably supporting the press switch 5 is formed as the operation portion 6 on which the ON operation is operated, and the front face 6a thereof is formed as the press portion on a part of the operation portion 6, the structures of the movement support portion and the press portion can be further simplified.

Furthermore, in this embodiment, the stopper 4g is provided as the stopper for stopping the movement of the operation portion 6 moved to the one of the directions of the reciprocal movement by the pressing operation, while the component P is not installed in the recess 3. If no stopper 4g is provided, the stroke of the operation portion 6 could become excessive when the component P is not installed in the recess 3. The operation portion 6 would then be slammed back against and collide with the inner wall of the recess 3, and it might result in damaging the operation portion 6, the inner wall, or the plate spring 8 supporting the operation portion 6. In addition, if the amount of the pressing is increased, an operator might feel uncomfortable. In this embodiment, the stopper 4g is provided to avoid such inconveniences.

Furthermore, in this embodiment, the stroke S2 of the operation portion 6 from its initial position before being pressed to the position at which the operation portion 6 is stopped by the stopper 4g is longer than the stroke S1 of the operation portion 6 from the initial position to the position at which the press switch 5 is in the ON state. Therefore, an operator can recognize whether the component P is installed in the recess depending on the difference in the stroke.

Furthermore, in this embodiment, the component installation portion is formed in the main body 2 as the recess 3, the cover 4 is attached to the main body 2 to cover the opening 3a of the recess 3 in an openable and closable manner, and the operation portion 6 is supported on the cover 4 so as to be reciprocally movable in a direction between a front face and a back face of the cover 4. Therefore, the operation portion 6, the press switch 5, and the plate spring 8, for example, can be maintained more easily than with those in a structure in which the operation portion 6 faces the component P in the back end of the recess 3.

Furthermore, in this embodiment, the stopper 4g that is the stopper for the operation portion 6 is arranged on the cover 4. Therefore, the structure can be further simplified in comparison with a structure in which the stopper is arranged on a member other than the cover 4.

Furthermore, in this embodiment, the ribs 4c are arranged on the back face 4b of the cover 4 facing the recess 3, and the stopper 4g is arranged on each of the ribs 4c. Therefore, the stoppers can be formed relatively easily in the structure having the ribs 4c. Furthermore, a more rigid stopper can be provided than a structure in which a protrusion or the like is arranged separately.

Furthermore, in this embodiment, at least two of the ribs 4c are arranged on the back face 4b of the cover 4 facing the recess 3, having the operation portion 6 that is the movement support portion interposed therebetween. This configuration prevents, as illustrated in FIG. 3, the component P, a finger of an operator, or the like from unintentionally coming into contact with the press switch 5 arranged on the operation portion 6 as the movement support portion.

Figure 10:
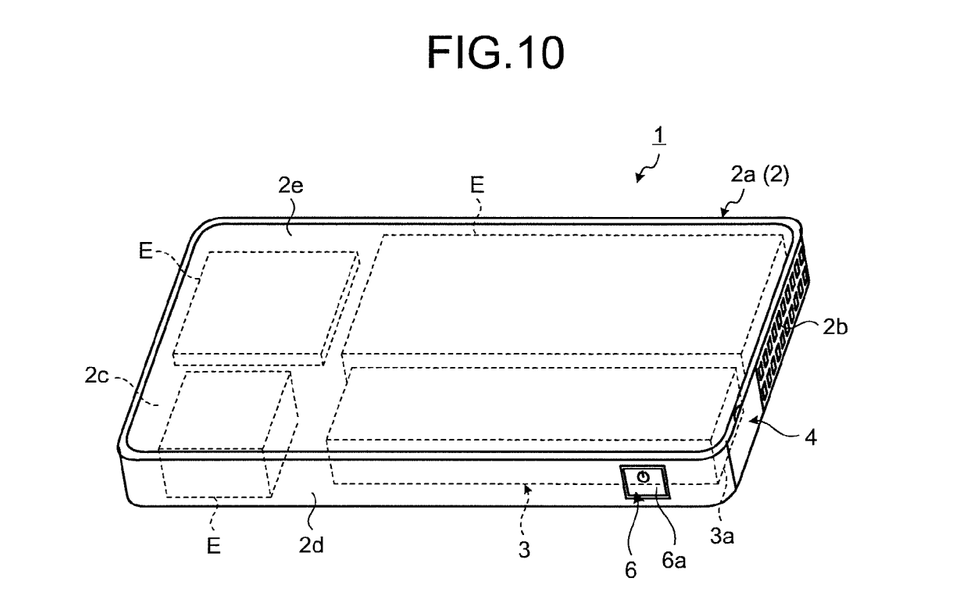
FIG. 10 is an exemplary perspective view of an electronic device according to a modification of the embodiment.

FIG. 10 illustrates an exemplary modification of the embodiment. In the modification, the operation portion 6 that is the movement support portion is arranged on a different position facing the recess 3 that is the component installation portion. In other words, the same operation portion 6 as that of the above embodiment may be formed on one of the walls surrounding the recess 3 (on a side wall 2d or a top wall 2e, for example; on the side wall 2d in the example illustrated in FIG. 10), instead on the cover 4.

Furthermore, in the example disclosed in the embodiment, the electronic device 1 is explained to be a personal computer. However, the embodiment may also be implemented as a fuel cell device, for example, to which a fuel cartridge corresponding to the component may be fitted therein in a removable manner. In such a structure, the fuel cell device comprises a cell stack that is an electrogenic module, a pump that supplies fuel and the air to the cell stack, a fluid supplying system including a valve, a pipe, and the like, and a controlling system or the like that controls each module in the fuel cell device (none of which is illustrated). The fuel cartridge contains high concentration methanol that is a fluid fuel, for example.

Furthermore, the component may be, for example, a removable HDD or ODD, instead of the battery or the fuel cartridge. In this embodiment, the component P corresponds to an opposing member arranged in a track of the movement support portion toward one of the directions of the reciprocal movement when the component is installed in the component installation portion, as well as to moved away from the track when the component is removed from the component installation portion. However, a separate opposing member that is not the component P may be provided. For example, the opposing member may be a movable bracket arranged on the main body and provided for installation of the component, or a mechanism working in cooperation with the component.

The positioning of the switch is also not limited to the one in the embodiment. In other words, the switch may be arranged on the movement support portion with the movable portion facing the movement support portion, and the base facing the component or the opposing member. In such a structure, it is preferable to provide the movement support portion with a separate member biased toward the component or the opposing member and arranged apart from the movement support portion, for example, and to attach a base to the separate member. The movement support portion may also be supported on the main body in a reciprocally slidable manner, instead of being supported on the main body in a swingable manner.

The present embodiment may be implemented as an electronic device other than the personal computer or the fuel cell device. The specifications (structure, quantity, shape, arrangement, size, material, and so on) of the switch, the movement support portion, the stopper, the cover, the ribs, and the like may also be changed as appropriate.

While certain embodiments have been described, these embodiments have been presented by way of example only, and are not intended to limit the scope of the inventions. Indeed, the novel device described herein may be embodied in a variety of other forms; furthermore, various omissions, substitutions and changes in the form of the device described herein may be made without departing from the spirit of the inventions. The accompanying claims and their equivalents are intended to cover such forms or modifications as would fall within the scope and spirit of the inventions.

What is claimed is:

1. An electronic device comprising:
a main body to which a component installation portion is formed, a component being detachably installed in the component installation portion;
a switch comprising a base and a movable portion, the switch is set into an ON state when the movable portion is moved relatively closer to the base;
a movement support portion provided to the main body, the movement support portion being configured to support the switch so as to permit reciprocal movement of the switch along a direction in which the movable portion is moved closer to the base, and configured to be moved to one of directions of the reciprocal movement by a predetermined ON operation, the movement support portion includes a press portion provided on one side of the movement support portion to receive a pressing operation as the ON operation; and
a stopper configured to regulate, when the component is not installed in the component installation portion, movement of the movement support portion moved toward the one of the directions of the reciprocal movement by the pressing operation, wherein,
while the component is installed in the component installation portion, the switch is sandwiched between the component and the movement support portion moved to the one of the directions of the reciprocal movement by the ON operation, the movable portion is moved relatively closer to the base, and the switch is placed to the ON state.

2. The electronic device of claim 1, wherein a stroke of the movement support portion from an initial position thereof to a position at which the movement is regulated by the stopper is longer than a stroke of the movement support portion from the initial position thereof to a position at which the switch becomes the ON state.

3. The electronic device of claim 1, wherein
the component installation portion is formed as a recess in the main body; and
the movement support portion is supported on a periphery wall of the component installation portion so that the movement support portion is reciprocally movable in a direction between a front and a back of the periphery wall.

4. An electronic device comprising:
a main body to which a component installation portion is formed, a component being detachably installed in the component installation portion, the component installation portion is formed as a recess in the main body;
a switch comprising a base and a movable portion, the switch is set into an ON state when the movable portion is moved relatively closer to the base;
a movement support portion provided to the main body, the movement support portion being configured to support the switch so as to permit reciprocal movement of the switch along a direction in which the movable portion is moved closer to the base, and configured to be moved to one of directions of the reciprocal movement by a predetermined ON operation;
a cover provided to the main body to openably cover an opening of the recess, the movement support portion being supported by the cover so that the movement support portion is reciprocally movable in a direction between a front and a back of the cover; and
a stopper configured to regulate, when the component is not installed in the component installation portion, movement of the movement support portion moved toward the one of the directions of the reciprocal movement by a pressing operation, the stopper being provided on the cover,
wherein while the component is installed in the component installation portion, the switch is sandwiched between the component and the movement support portion moved to the one of the directions of the reciprocal movement by the ON operation, the movable portion is moved relatively closer to the base, and the switch is placed in the ON state.

5. The electronic device of claim 4, further comprising a rib provided on a back face side of the cover facing the recess, wherein the stopper is provided to the rib.

6. The electronic device of claim 4, further comprising at least two ribs provided on a back face side of the cover facing the recess, the movement support portion being sandwiched between the ribs.

7. An electronic device comprising:
a main body to which a component installation portion is formed, a component being detachably installed in the component installation portion;
a switch comprising a base and a movable portion, and configured to become an ON state when the movable portion is moved relatively closer to the base;
a movement support portion provided to the main body, configured to support the switch so as to permit reciprocal movement of the switch along a direction in which the movable portion is moved closer to the base, and configured to be moved to one of directions of the reciprocal movement by a predetermined ON operation; and an opposing member arranged in a track of the movement support portion toward the one of the directions of the reciprocal movement when the component is installed in the component installation portion, and moved away from the track when the component is removed from the component installation portion, wherein while the component is installed in the component installation portion, the switch is sandwiched between the opposing member and the movement support portion moved to the one of the directions of the reciprocal movement by the ON operation, the movable portion is moved relatively closer to the base, and the switch becomes the ON state.

* * * * *